Dec. 26, 1961     S. P. CALDWELL     3,014,444
RUFFLER ATTACHMENT FOR SEWING MACHINES

Filed April 1, 1958     6 Sheets-Sheet 1

INVENTOR
Samuel P. Caldwell
BY Rockwell & Bartholow
ATTORNEYS

Dec. 26, 1961　　S. P. CALDWELL　　3,014,444
RUFFLER ATTACHMENT FOR SEWING MACHINES
Filed April 1, 1958　　6 Sheets-Sheet 2
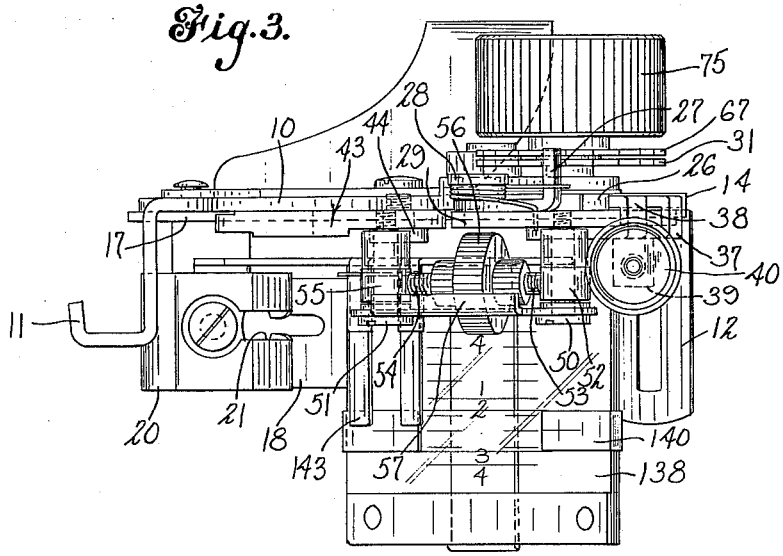
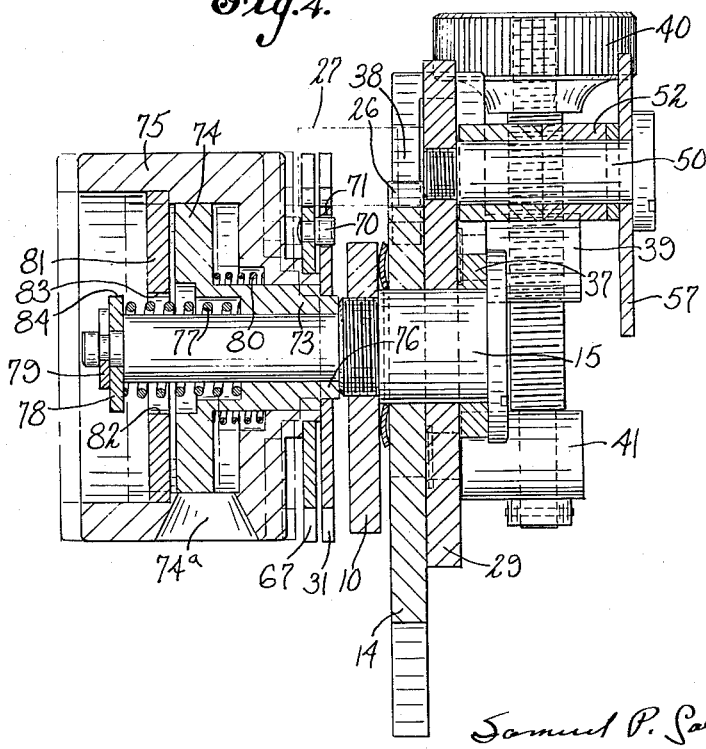
INVENTOR
Samuel P. Caldwell
BY Rockwell - Barthotow
ATTORNEYS

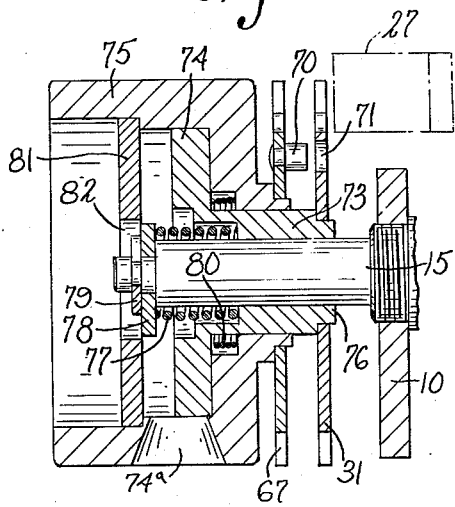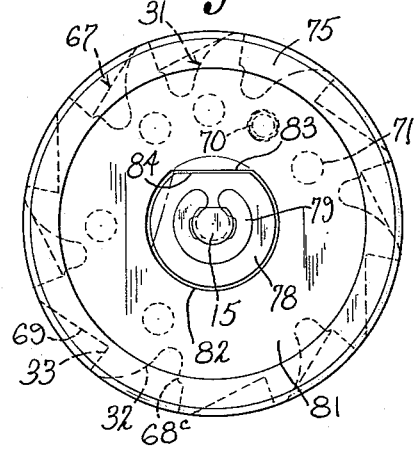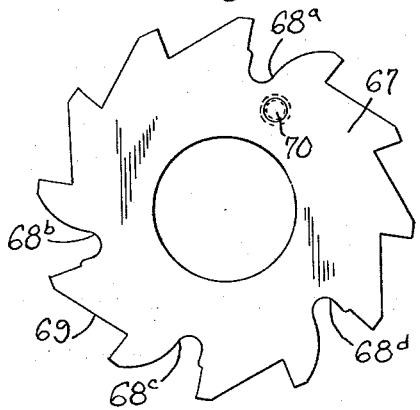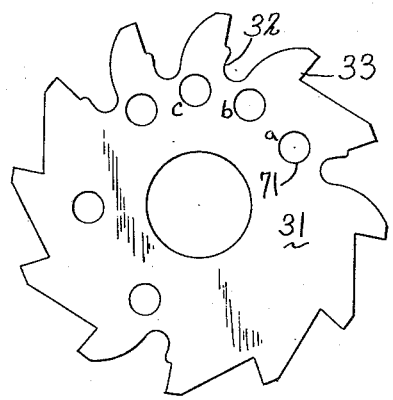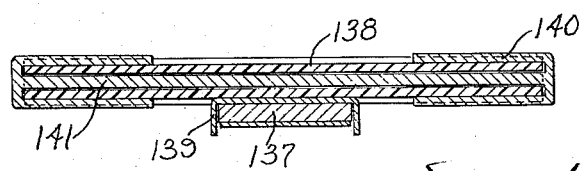

Dec. 26, 1961 S. P. CALDWELL 3,014,444
RUFFLER ATTACHMENT FOR SEWING MACHINES
Filed April 1, 1958 6 Sheets-Sheet 4

INVENTOR
Samuel P. Caldwell
BY Rockwell-Batchelor
ATTORNEYS

Dec. 26, 1961 S. P. CALDWELL 3,014,444
RUFFLER ATTACHMENT FOR SEWING MACHINES
Filed April 1, 1958 6 Sheets-Sheet 5
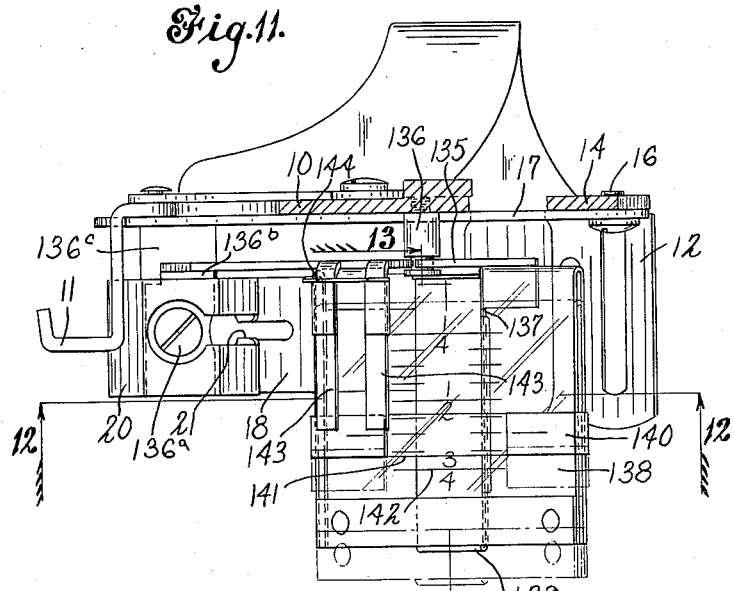
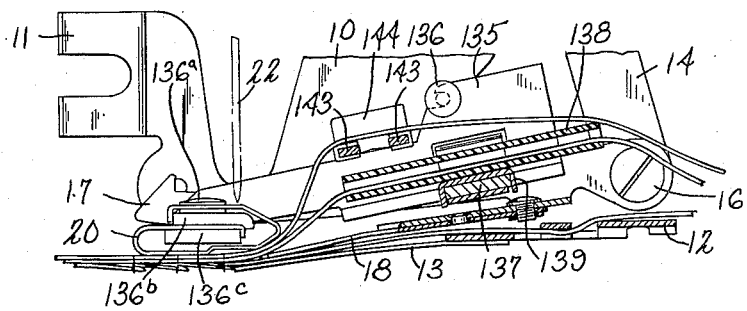
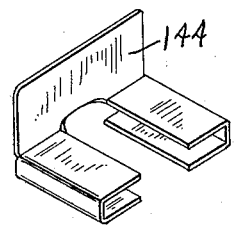
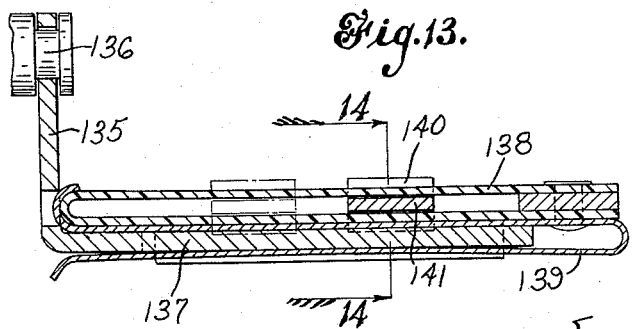
INVENTOR
Samuel P. Caldwell
BY Rockwell Bartholow
ATTORNEYS

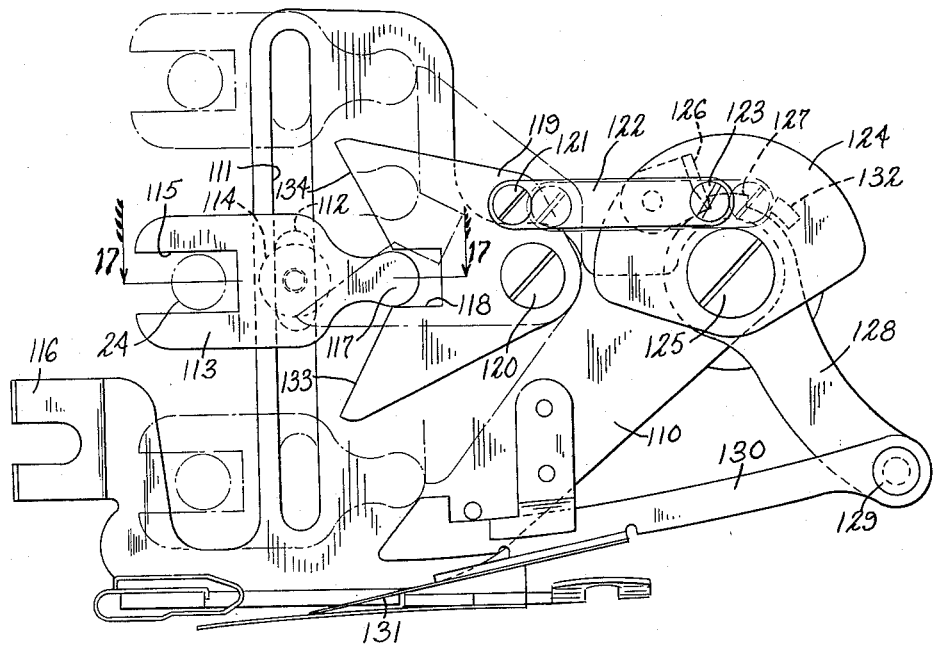
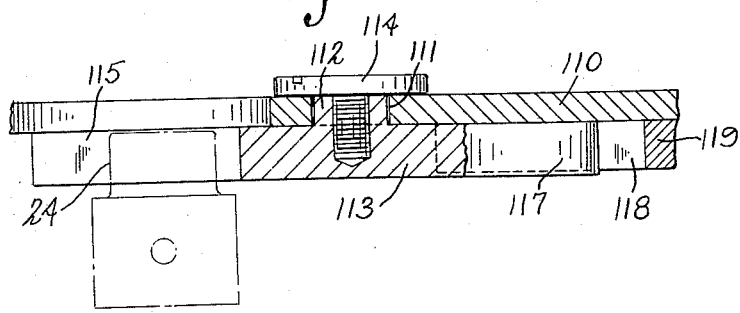

3,014,444
RUFFLER ATTACHMENT FOR
SEWING MACHINES
Samuel P. Caldwell, Hamden, Conn., assignor, by mesne assignments, to Mite Corporation, New Haven, Conn., a corporation of Delaware
Filed Apr. 1, 1958, Ser. No. 725,608
8 Claims. (Cl. 112—135)

This invention relates to sewing machine attachments and more particularly to such an attachment as a ruffler, for example, wherein the moving parts of the device are actuated from the needle bar of the sewing machine.

In many sewing machine attachments the mechanism is actuated by a forkarm or lever which is pivoted on the attachment and connected in some manner to the needle bar so that reciprocation of the needle bar effects oscillation of the forkarm which in turn actuates the moving parts of the attachment. Usually the forkarm is provided with a bifurcated or forked end which straddles a hub or boss or some protruding portion on the needle bar in order to bring about the oscillation of the forkarm by the reciprocation of the needle bar.

Sewing machine attachments are made in quantity and are made for sewing machines made by various manufacturers, and it is, of course, desirable to provide, if possible, an attachment which will be universal in character in that it can be used with all or a large number of sewing machines regardless of the make. The machines of different manufacturers vary in many particulars, among these being the length of stroke of the needle bar, the range of stroke of the needle bar with particular reference to the position of the hub thereon at the front and lower ends of its stroke with respect to its distance from the bed of the machine. Also machines differ in the distance between or spacing of the presser bar to which the attachment is usually secured and the needle bar. Thus where this distance varies between two machines, the forkarm may be oscillated through a different angle even though the length of stroke of the needle bar might be the same as the effective length of the forkarm lever would be varied.

It is contemplated by the present invention to produce a sewing machine attachment such as a ruffler mechanism, for example, which will be universal in application in that it may be used on a great many machines regardless of the length of stroke of the needle bar, the range of stroke of the needle bar, and the distance between the presser bar and the needle bar. In order to effect this result the attachment has been so constructed that only a part of the stroke of the movement is employed to actuate the forkarm of the attachment. The part that is employed will be no greater than the minimum provided on any machine of standard make and, therefore, the operation of the forkarm will be independent of the length of this stroke. Also the part of the stroke of the needle bar which is employed for actuating the forkarm will be chosen from the intermediate portion of the range of this stroke so that the lower and upper positions of the effective portion of the stroke will always be the same and the operation of the mechanism of the attachment will be independent of the range of the needle bar stroke.

While the invention is illustrated in the present application as applied to a ruffler, it is understood that it may be applied to other attachments which employ a pivoted forkarm connected to the needle bar. In the particular device illustrated, however, other improvements have resulted so that an improved ruffler mechanism has been produced in addition to the production of one which is universal in that it may be used with machines of many different makes.

One object of the present invention is to produce a new and improved sewing machine attachment of universal application.

A further object of the invention is to produce a new and improved sewing machine attachment wherein the mechanism is actuated by a forkarm adapted for connection to the handle bar of the sewing machine and wherein only a part of the stroke of the needle bar is employed to actuate the forkarm.

Still another object of the invention is to provide a new and improved sewing machine attachment having a pivoted forkarm adapted for connection of the needle bar wherein the range of movement of the forkarm will be independent of the length of the stroke of the needle bar or the range of movement of this stroke and also be independent on the distance between the needle bar and the presser bar to which the attachment may be secured.

Still other objects of the invention are to provide a new and improved ruffler mechanism which will not only be adapted for universal use with sewing machines of different manufacturers, but which will effect improved ruffling operations. Among other things, a greater range in the size of the pleat or ruffle is possible, additional ruffling sequences or patterns may be produced, and the pleat settings may be constant in all locations thereof.

To these and other ends the invention consists in the novel features and combinations of parts to be hereinafter described and claimed.

In the accompanying drawings:

FIG. 3 is a top plan view of the mechanism;

FIG. 4 is a sectional view on line 4—4 of FIG. 1;

FIG. 5 is a fragmentary sectional view taken on the same section line as FIG. 4, showing the parts in another position;

FIG. 6 is an end view of the parts shown in FIG. 5;

FIGS. 7 and 8 are elevational views of the cooperating cams for varying the operation of the mechanism;

FIG. 11 is a sectional view on line 11—11 of FIG. 1;

FIG. 12 is a sectional view on line 12—12 of FIG. 11;

FIG. 13 is a sectional view on line 13—13 of FIG. 11;

FIG. 14 is a sectional view on line 14—14 of FIG. 13;

FIG. 15 is a perspective view of the cloth-guiding means;

FIG. 16 is a view similar to FIG. 1 showing a modified form of the invention; and FIG. 17 is a sectional view on line 17—17 of FIG. 16.

Figure 1:
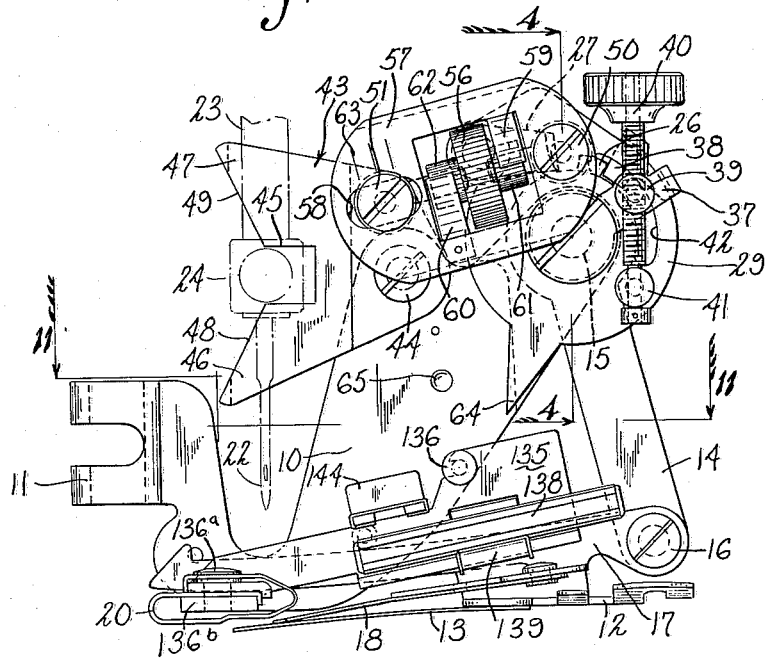
FIG. 1 is a side elevational view of a ruffler mechanism embodying my invention.

To illustrate an embodiment of the invention there is shown in FIG. 1 of the drawings a ruffler attachment for sewing machines comprising a frame 10 having secured to the forward portion thereof an adapter 11 to be secured to the presser bar of a sewing machine. Secured to the frame 10 at the lower portion thereof is a cloth guide member 12 to which is attached to extend forwardly therefrom a stationary or fixed ruffling plate 13, which member is usually made of resilient material.

A pendulum lever 14 is pivoted to the frame upon the pivot pin 15 (FIGS. 1 and 4), this being the main pivot of the mechanism. To the lower end of the pendulum lever is pivoted at 16 a carrier member 17 which carries a movable ruffling blade 18 which is usually a flexible member and cooperates with the plate 13 to produce a ruffle in the material passing between the members 13 and 18. Also secured to the forward end of the frame 10 in a position spaced laterally thereof is a foot member 20 provided with a needle slot 21 to receive the needle shown in dotted lines at 22 (FIG. 1). The needle is carried by the usual reciprocating needle bar 23 which is provided with a hub or stud 24 which serves to actuate the ruffling mechanism as will be hereinafter explained.

Figure 2:
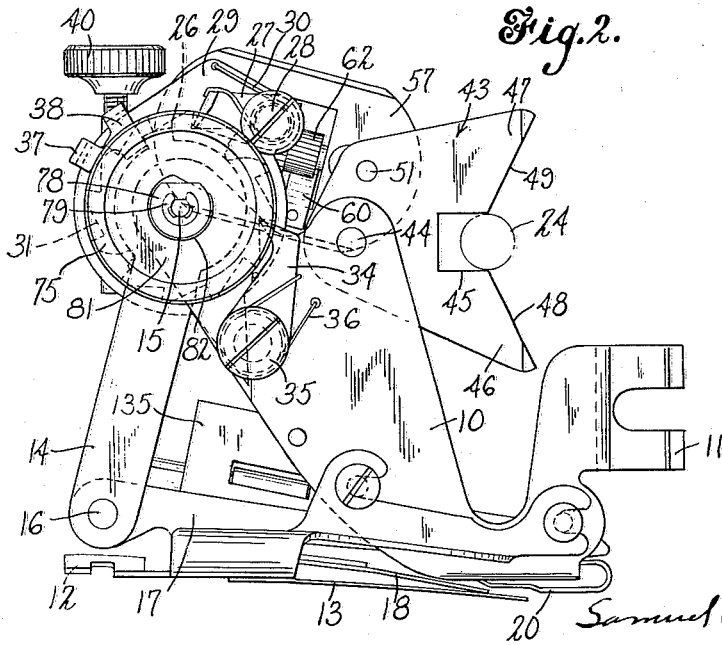
FIG. 2 is an elevational view from the opposite side thereof.

The pendulum lever 14 is provided upon its upper edge with a lug 26 (FIG. 2) which is adapted to be engaged by a pawl 27 pivotally mounted at 28 upon a pawl carrier 29, the pawl being urged into a position to engage the lug 26 by a spring 30.

The pawl 27 also engages a ratchet wheel 31 (FIGS. 2 and 8) mounted to rotate about the axis of the pivot pin 15. This ratchet wheel is provided with a series of teeth, the recesses between some of the teeth being relatively deep, as shown at 32, and between others of the teeth being relatively shallow, as shown at 33. It is only when the pawl 27 is received in one of the deep recesses or notches 32 that the pawl 27 is permitted to engage the lug 26 and move the pendulum lever 14. The pawl carrier 29 is adapted to be oscillated by means hereinafter described, and it will be understood that upon each oscillation the pawl will engage one of the teeth of the ratchet wheel and will thereby effect rotation of the same in a step-by-step movement. A holding pawl 34 is pivoted on the frame at 35 (FIG. 10) and urged by a spring 36 into engagement with the teeth of the ratchet wheel 31 in order to prevent retrograde movement of the ratchet wheel upon return of the pawl.

An arm 37 (FIG. 1) is pivotally mounted on the main pivot 15 and extends radially outwardly over the oscillating pawl carrier 29 and adjacent the periphery of the carrier is provided with a lug or abutment 38 (FIG. 2) adapted to engage the lug 26 upon the pendulum lever 14 and effect the return movement of this lever after it has been moved in a forward or ruffling direction. Pivotally mounted in the arm 37 is a pin 39 through which is threaded an adjusting screw 40, this screw having its lower end rotatably mounted in a post 41 rotatably mounted in the member 29, this mounting being such as to prevent longitudinal movement of the screw upon its rotation. The pawl carrier 29 is provided with a slot 42 in which the pin 39 moves when adjusted by the screw 40. With this arrangement it will be seen that rotation of the screw 40 moves the arm 37 about its pivot 15 over the pawl carrier 29 so as to adjust the position of the retracting member 38. Adjustment of this member determines the extent of the return throw of the lever 14 and, therefore, determines the length of its forward stroke and thereby the width of the ruffle or pleat.

A power take-off member 43 is pivoted at 44 to the frame member 10, this member being provided with an open slot 45 to receive the hub or post 24 secured to the needle bar 23 whereby reciprocations of the needle bar will effect oscillation of the member 43 about its pivot 44. The slot or recess 45 is open at one end so that the post 24 may be received therein and is provided adjacent this opening with wing members 46 and 47 presenting inclined faces 48 and 49. When the needle bar moves upwardly or downwardly from its position shown in FIG. 1 to the position shown in FIGS. 9 or 10, for example, it will be seen that the lug 24 will ride downwardly over the surface 48 or upwardly over the surface 49 and thereby escape from the slot 45. Upon escape of the hub member from the slot the surfaces 48 and 49 will be tangent to the periphery of the hub so that no further oscillation of the power take-off member 43 will be effected although the hub 24 and needle bar will have additional travel. With this construction it will be seen that only a portion of the travel of the needle bar is employed to move the member 43 and, as the hub member escapes from the slot 45 upon both its upward and downward movement, only the intermediate portion of the stroke of the needle bar is effective to operate the mechanism of the ruffler.

A pin 50 is secured to the pawl carrier 29 (FIG. 3) and a similar pin 51 is secured to the power take-off member 43. Pivoted upon the pin 50 by a collar 52 is a threaded screw 53 and likewise a threaded screw 54 is secured to a collar 55 pivoted upon the pin 51. The screws 53 and 54 have right- and left-hand threads and are connected by a turn buckle 56 so that rotation of the latter will shorten or lengthen the distance between the pins 50 and 51 and thus affect the relative positions of the pawl carrier 29 and the member 43. A plate 57 is mounted upon the pins 50 and 51, this plate being provided with a slot 58 which receives the pin 51 so as to permit adjustment of the members 29 and 43. Secured to this plate are spring detents 59 and 60 adapted to engage knurled members 61 and 62 on the turn buckle 56 to releasably hold the turn buckle in an adjusted position. This plate may also be provided with indicia 63 to indicate the adjustment of the turn buckle or the adjusted distance between the pins 50 and 51.

By adjusting the turn buckle the adjusting link between the member 43 and the pawl carrier 29 can be made longer or shorter, and thus the position of the final advancement of the feed blade or ruffling blade can be accurately determined for any particular machine, and likewise the stitch on the pleat can be set to the desired position. This adjustment will compensate for varying distances between the needle bar and the presser bar and also for varying sizes of the hub member 24 upon the needle bar of the sewing machine with which the attachment is used. It will be appreciated that a smaller hub 24 will ride out of the slot 45 upon a shorter stroke of the needle than if the hub were larger, and the same is also true where the distance between the presser bar and the needle bar of the machine varies.

The pawl carrier 29 may be provided with a pointer 64 and a target 65 may be placed upon the frame member 10. It is then merely necessary after the ruffler is mounted on the machine to turn the hand wheel until the needle bar is at the top of its stroke, as shown in dotted lines in FIG. 10. The turn buckle 56 may then be rotated to bring the pointer onto the target and thus, by setting the pointer to the desired position on the target, the stitch on the pleat can be set to the desired position. Thus the attachment may be substantially universal in that it will fit any machine regardless of the spacing of the needle bar and presser bar, the size of the hub 24, or the stroke of the needle bar itself.

It is also desirable to be able to effect a plurality of ruffling sequences or to vary the number of stitches made by the sewing machine between adjacent ruffles. This is effected by means of the ratchet wheel 31 (FIG. 8) previously referred to and a cooperating ratchet wheel 67 shown in FIG. 7. This ratchet wheel may be provided with a number of deep notches or recesses 68a, 68b, 68c and 68d and a number of shallow notches 69 as in the case of the ratchet wheel 31. As indicated in FIG. 7, there are twelve teeth upon the ratchet wheel 67 and four of the deep notches, some of these being separated by three shallow notches and others by a single shallow notch. As illustrated, the deep notch 68a is separated from the deep notches 68b and 68d by three shallow notches, while the deep notch 68c is separated from each of the notches 68b and 68d by a single shallow notch.

This ratchet wheel, as will be explained hereinafter, is mounted in juxtaposition to the ratchet wheel 31, shown in FIG. 8. These two wheels may be termed pattern wheels or a pattern mechanism as in most positions of adjustment the pawl 30 will engage the teeth of both wheels and it is only when the deep notches of one wheel register with those of the other that the pawl is permitted to engage the shoulder or lug 26 and actuate the pendulum lever 14 to which the ruffling blade 18 is attached. By moving one of these pattern wheels with respect to the other, various ruffling sequences can be obtained. As both of these wheels are mounted to rotate about the pivot pin 15 as an axis, means are provided to releasably secure them together for simultaneous rotation. This means is constituted by a pin 70 secured to the pattern wheel 67 and a plurality of perforations 71 provided in the body of the pattern wheel 31 to receive this pin.

The manner of mounting the pattern wheels 31 and 67 is shown more particularly in FIGS. 4 and 5. The pattern wheel 31 is secured to a sleeve member 73 rotatably mounted upon the pin 15, this sleeve member having a flange 74 within a cup-shaped member 75 provided with a hub 76 to which the pattern wheel 67 is secured. This member 75 is rotatably mounted upon the sleeve 73 so that the members 75 and 73 may rotate independently of each other.

A spring 77 is mounted between the sleeve member 73 and a collar 78 on a reduced portion of the pivot pin 15, this collar being held in place by a split washer 79 whereby this spring normally urges the sleeve member 73 toward the right as shown in these figures.

A compression spring 80 is mounted between the hub 76 of the cup-shaped member 75 and the flange 74 so that the cup-shaped member 75 is also normally urged toward the right, as shown in FIG. 4, to urge the pattern wheel 67 toward the pattern wheel 31 and engage the pin 70 in one of the openings 71 if the pin and opening are in registration.

A washer 81 is secured within the cup member 75, which washer is provided with a central opening 82 through which the pin 15 normally extends, as shown in FIG. 4. The opening 82 is provided with a flat side, as shown at 83 (FIG. 6), and the collar 78 is also provided with a flat side, as shown at 84 in this figure. Therefore, in one position of these parts when the flat side of the collar 78 registers with the flat side of the opening 82, the cup member 75 may be drawn to the left from the position shown in FIG. 4 to the position shown in FIG. 5 where the washer 78 has passed through the opening 82.

The normal position of these parts is shown in FIG. 4 where both springs are extended and the pawl 27 shown in dotted lines in FIG. 4 engages both of the pattern or ratchet wheels. As previously stated, therefore, this pawl will only operate the ruffling blade when it engages in the deep notches of both wheels which are in registration. By turning the pattern wheel 67 with respect to wheel 31, any one of a number of different ruffling sequences may be obtained (six as shown in the drawings) depending upon which one of the six openings 71 is engaged by the pin 70. When it is desired to set the pattern wheels to a different pattern or ruffling sequence, the operator grasps the cup member 75 which may be knurled on its periphery, as shown in FIG. 3, and pulls this cup slightly to the left from the full- to the dotted-line position shown in FIG. 4, compressing the spring 80 but the cup member is not moved a sufficient extent to move the hub 73 to the left. This withdraws the wheel 67 to a position in which it is disengaged from the pawl 27 and also in which the pin 70 is disengaged from the opening 71 in which it was received. In this position of the parts the cup member 75 may be rotated to rotate the pattern wheel 67 to the new position required for the desired ruffling sequence.

If, for example, the pin 70 is placed in one of the openings 71 designated by the letter $a$, none of the deep notches 68 will be in registration with any of the deep notches 32 and plain stitching will result. However, if the pin 70 is moved to register with the opening marked with the letter $b$, the deep notches $68^a$ and $68^c$ of the openings 68 of the pattern wheel 67 will register with two of the deep openings 32 of the wheel 71 and a ruffle will be produced at every sixth stitch. If the pin 70 is moved to the opening 71 which is marked with the letter $c$, a ruffle will be produced every twelfth stitch as only one of the deep openings 68 will register with one of the openings 32. The particular configuration of the pattern wheels illustrated will also give an opening every fourth stitch and also certain other combinations in which the number of stitches between the openings will vary.

If it is desired to effect a ruffle at every stitch of the machine, the member 75 will be moved still further to the left, as shown in FIG. 5, wherein the bottom of the cup-shaped member 75 will engage the flange 74 and also move the pattern wheel 31 to the left beyond the range of engagement by the pawl 30. If in this position the cup member 75 is then turned slightly until the flats 83 and 84 are no longer in registration, the member 75 will be retained in this position and not be permitted to be moved inwardly or to the right by the spring 77. It will, of course, be understood that suitable indicia may be provided on the member 75, 74 visible through the opening $74^a$ to indicate to the user the particular setting of the pattern wheel 67 with respect to the pattern wheel 71 so that the user will know the ruffling sequence for which the attachment is set.

Figure 9:
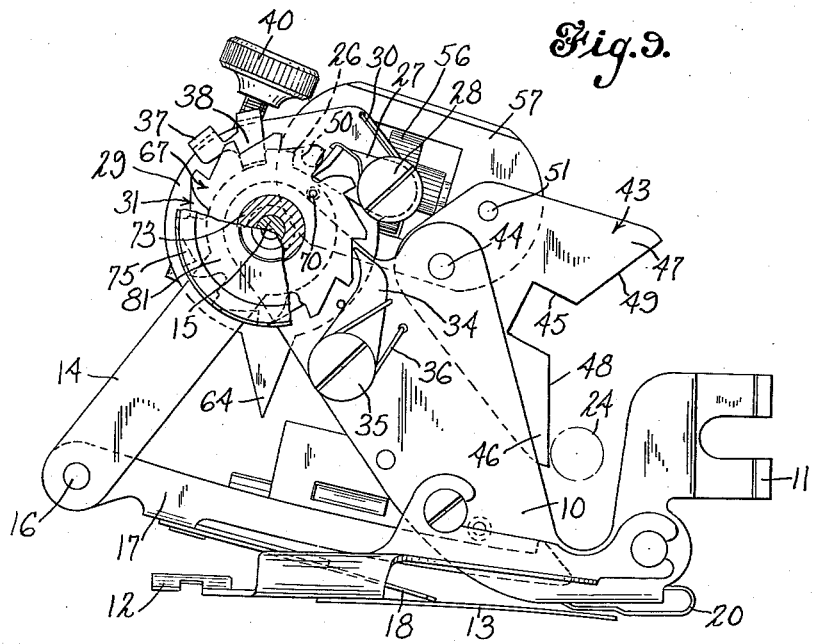
FIG. 9 is a view similar to FIG. 2 but some parts being broken away and the pendulum lever and ruffling blade being shown in their retracted position with the needle bar at the lower portion of its stroke.
Figure 10:
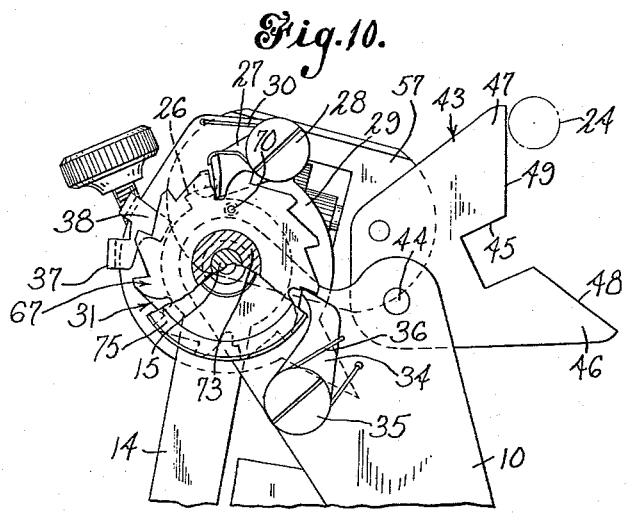
FIG. 10 is a fragmentary view similar to FIG. 9 showing the position of some of the parts when the needle bar is at the upper end of its stroke.

In the operation of the device, it will be apparent that upon reciprocation of the needle bar the power take-off member 43 will be oscillated about its pivot point 44. However, when the needle bar moves downwardly to a point at which the hub 24 rides upon the face 48 of the member 43, the engagement between these parts will be broken and, as shown in FIG. 9, the needle bar will be permitted further descent without effecting any movement of the lever 43. The same action will take place upon the upward movement of the needle bar as illustrated in FIG. 10. Thus only the intermediate part of the stroke of the needle bar is employed to actuate the attachment which in the form illustrated is approximately 75 percent of this stroke. Thus the operation of the ruffling blade will be independent of the length of the stroke of the needle bar so long as it has a stroke as long as the minimum required to effect full oscillation of the member 43. Moreover, as the intermediate part of the stroke is the effective one in the operation of the attachment, the latter will be independent of the range of the stroke of the needle bar, that is to say, will be independent of its height above the base of the sewing machine at the upper and lower ends of its stroke.

As has also been previously explained, variations in the distance between the needle bar and presser bar and variations in the size of the hub or post 24 in various machines are compensated by adjustment of the turn buckle 56 so that the attachment will be a universal one applicable to machines of any or at least a large number of manufacturers.

A modified form of my invention is shown in FIGS. 16 and 17 of the drawing. In this instance the frame 110 is provided with a slot 111 in which rides a boss 112 secured to a slide member 113, this slide member being held in place by the headed screw 114. This slide member is provided with an opening or recess 115 to receive the hub 24 of the needle bar of the sewing machine so that the slide 113 will partake of the movements of the needle bar in its reciprocation. The opening 115 is open at its outer end and is of sufficient depth so that it will receive the member 24 regardless of the position of the needle bar from the presser bar to which latter member the adapter 116 is secured. Thus compensation is provided for variation in the distance by which these two members may be separated.

The slide 113 is provided with a rounded end portion 117 which is received in an open-ended recess 118 in a member 119 pivoted at 120 to the frame 110. This member 119 is shaped similarly to the power take-off member 43 described in connection with the modification shown in FIGS. 1 to 10 of the drawings and to this member is pivoted at 121 a link 122, the other end of which is pivoted at 123 to a pawl carrier 124 pivoted to the frame at 125. The member 124 carries a pawl 126 adapted to engage a lug 127 on a pendulum lever 128, to the lower end of which is pivoted at 129 a supporting member 130 for the flexible ruffling blade 131. The pawl carrier 124 also is provided with a lug 132 adapted to engage the other side of the lug 127 so as to move the pendulum lever 128 in the other direction.

In this modification of the invention, which is similar to that previously shown, the power take-off member 119, instead of being engaged and operated by the hub 24 on the needle bar, is operated by the end 117 of the slide 113 which is moved by and with the needle bar. Thus compensation is made for the position of the hub 24 with respect to the member 119 or in other words compensation is made for the distance between the presser bar and the needle bar of the sewing machine. Compensation is also made for the size of the hub 24 as the device is operated directly by the rounded member 117, the size of which may be predetermined.

This member 117, it will be understood, rides over the inclined surfaces 133 and 134 of the member 119 when it is released from the recess 118 as previously described in connection with the first embodiment of my invention so that the effective, or used, part of the stroke of the needle bar is the intermediate part of this stroke as before.

Therefore, the link 122 need not be adjustable as is the connection between the pivots 50 and 51 in the first form of my invention.

It will be seen that in this form of my invention the angle through which the member 119 is oscillated will always be constant, as the portion of movement of the slide 113 which is utilized will always be the same regardless of the stroke of the needle bar, regardless of the size of the hub 24, or regardless of the position of the needle bar with respect to the presser bar. Therefore, in this instance the position of the parts may be predetermined and adjustment of the effective length of the link 122 is not required. It will, of course, be understood that provision for different ruffling sequences may be employed with this form of my invention as well as with the form previously described.

In some instances it is desired to employ rickrack, lace or piping with a ruffling mechanism and provision for this is made in the present ruffler, as shown more particularly in FIGS. 11 to 15. To this end a plate-like member 135 (FIGS. 11 to 13) is secured to the frame 10 by the pin 136 and also by the screw 136ᵃ which passes through a lug 136ᵇ into the frame part 136ᶜ. The member 135 has a horizontally projecting arm 137. A hollow guide member 138 has secured to the lower surface thereof a spring clamp 139 which may be slipped frictionally upon the horizontally projecting arm 137 of the member 135. Thus the guide 138 will be frictionally held in place and may be adjusted toward and from the frame of the machine if desired.

Movably and frictionally mounted upon the guide 138 is a stop member 140 provided with a plate 141 disposed within the guide member. This stop member may be moved toward and from the frame 10 of the machine and, as the lace, piping or rickrack moves through the guide, its position may be determined by the position of the member 141. The guide member 138 may be of transparent material, as shown in FIG. 11, and may be provided with indicia 142 to indicate the width of the piping or rickrack for which it is set.

Also secured to the member 135 and projecting laterally from the frame 10 are a pair of arms 143, and slidably and frictionally carried by these arms is a cloth guide member 144 which may be moved along the arms 143 to properly guide a piece of material adapted to be sewed to the ruffle with the piping or rickrack.

While I have shown and described some embodiments of my invention, it will be understood that it is not to be limited to all of the details shown, but is capable of modification and variation within the spirit of the invention and within the scope of the claims.

What I claim is:

1. A ruffler attachment for use with a sewing machine having a reciprocating needle bar, said attachment comprising a frame, a ruffling blade carried by the frame for reciprocating movement, an actuating member pivotally mounted on the frame, means connecting said member to the needle bar of the sewing machine for actuation thereby during a part only of the reciprocation of the needle bar, said connecting means comprising an open-ended slot in said member, and an element reciprocable with the needle bar and engaged in said slot, the edges of said actuating member adjacent said slot being so shaped as to permit said needle bar element to ride out of said slot when said actuating member approaches the end of its movement in either direction, means connecting said actuating member to the ruffling blade comprising a pawl carrier oscillatably mounted on the frame and an adjustable connection between said carrier and said actuating member.

2. A ruffler attachment for use with a sewing machine having a reciprocating needle bar, said attachment comprising a frame, a ruffling blade carried by the frame for reciprocating movement, an actuating member pivotally mounted on the frame, means connecting said member to the needle bar of the sewing machine for actuation thereby during a part only of the reciprocation of the needle bar, said connecting means comprising an open-ended slot in said member, and an element reciprocable with the needle bar and engaged in said slot during the intermediate portion of the movement of the needle bar, and becoming automatically disengaged therefrom at the end portions of such movement, means connecting said actuating member to the ruffling blade comprising a pawl carrier oscillatably mounted on the frame and an adjustable connection between said carrier and said actuating member.

3. A ruffler attachment for use with a sewing machine having a reciprocating needle bar, said attachment comprising a frame, a ruffling blade carried by the frame for reciprocating movement, an actuating member pivotally mounted on the frame, means connecting said member to the needle bar of the sewing machine for actuation thereby, said connecting means being constructed to move said member through a predetermined angle about its pivot irrespective of the distance through which the needle bar moves, and means connecting said actuating member to the ruffling blade comprising a lever connected to the latter, a pawl carrier oscillatably mounted on the frame and carrying a pawl adapted to engage said lever, and an adjustable connection between said actuating member and said pawl carrier.

4. A sewing machine attachment as in claim 3 wherein the adjustable connection between the carrier and the actuating member comprises a turnbuckle construction connected at one end to the actuating member and at the other end to the carrier.

5. A ruffler attachment for a sewing machine having a reciprocating needle bar, said attachment comprising a frame, a ruffler blade mounted for reciprocating movement on said frame, an actuating member pivotally mounted on the frame, means connecting said member to the needle bar of the sewing machine for actuation thereby during a part only of the reciprocation of the needle bar, an oscillating pawl carrier also pivoted on the frame and having a pawl to actuate the ruffling blade, and an adjustable connection between said actuator and said pawl carrier.

6. A ruffler attachment for a sewing machine having a reciprocating needle bar, said attachment comprising a frame, a ruffler blade mounted for reciprocating movement on said frame, an actuating member pivotally mounted on the frame, means connecting said member to the needle bar of the sewing machine for actuation thereby during a part only of the reciprocation of the needle bar, an oscillating pawl carrier having a pawl to actuate the ruffling blade, means connecting said actuator to said pawl carrier, and means for adjusting the position of the pawl carrier when said actuator is at a predetermined point in its travel to adjust the position of the ruffling blade with respect to the actuator.

7. A ruffler attachment for a sewing machine having a reciprocating needle bar, said attachment comprising a frame, a ruffler blade reciprocable thereon, a lever pivoted on the frame and connected to said needle bar, a pawl carrier oscillatably mounted on the frame having a pawl thereon adapted to engage said lever, a pair of pattern wheels mounted for coaxial rotation on said frame and having teeth for engagement by said pawl to control the engagement of the pawl with said lever, said pattern wheels having shallow and deep notches therein whereby the pawl will engage said lever only when the deep notches of one wheel register with those of the other, and means for rotatably adjusting one of said wheels with respect to the other, said means comprising concentric relatively rotatable members, one carrying each of said wheels.

8. A ruffler attachment for a sewing machine having a reciprocating needle bar, said attachment comprising a frame, a ruffler blade reciprocable thereon, a lever pivoted on the frame and connected to said needle bar, a pawl carrier oscillatably mounted on the frame having a pawl thereon adapted to engage said lever, a pair of pattern wheels mounted for coaxial rotation on said frame and having teeth for engagement by said pawl to control the engagement of the pawl with said lever, said pattern wheels having shallow and deep notches therein whereby the pawl will engage said lever only when the deep notches of one wheel register with those of the other, means for rotatably adjusting one of said wheels with respect to the other, an actuating member pivoted on the frame and connected to the needle bar for actuation thereby during a part only of the stroke of the latter, and means for adjustably connecting said actuating member to said pawl carrier to vary the position of the latter and thereby vary the position of the ruffling blade with respect to the actuating member.

References Cited in the file of this patent

UNITED STATES PATENTS

| | | |
|---|---|---|
| 135,359 | Perkins | Jan. 28, 1873 |
| 176,148 | Sourwine | Apr. 18, 1876 |
| 274,077 | Yentzer | Mar. 13, 1883 |
| 546,670 | Laubscher | Sept. 24, 1895 |
| 564,359 | Barnum | July 21, 1896 |
| 928,792 | Parsons | July 20, 1909 |
| 959,330 | Fleigel | May 24, 1910 |
| 1,752,096 | Lawton et al. | Mar. 25, 1930 |
| 1,830,398 | Maashoff | Nov. 3, 1931 |
| 2,669,954 | Russell | Feb. 23, 1954 |

FOREIGN PATENTS

| | | |
|---|---|---|
| 308,947 | Great Britain | Apr. 4, 1929 |